United States Patent [19]

Eschbach et al.

[11] Patent Number: 5,681,357
[45] Date of Patent: Oct. 28, 1997

[54] GEL ELECTROLYTE BONDED RECHARGEABLE ELECTROCHEMICAL CELL AND METHOD OF MAKING SAME

[75] Inventors: Florence O. Eschbach; Manuel Oliver, both of Duluth, Ga.

[73] Assignee: Motorola, Inc., Schaumburg, Ill.

[21] Appl. No.: 718,032

[22] Filed: Sep. 23, 1996

[51] Int. Cl.⁶ .......................... H01M 10/40; H01M 2/16
[52] U.S. Cl. ..................... 29/623.5; 29/623.4; 429/192; 429/142
[58] Field of Search .................. 429/192, 142, 429/247; 29/623.3, 623.4, 623.5

[56] References Cited

U.S. PATENT DOCUMENTS

| | | | |
|---|---|---|---|
| 3,216,863 | 11/1965 | Parker et al. | 429/145 |
| 4,119,770 | 10/1978 | Land | 429/152 |
| 4,994,335 | 2/1991 | Kamaei et al. | 429/254 |
| 5,011,751 | 4/1991 | Yoneyama et al. | 429/192 |
| 5,437,692 | 8/1995 | Dasgupta et al. | 29/623.1 |
| 5,516,339 | 5/1996 | Bailey | 29/623.1 |
| 5,521,023 | 5/1996 | Kejha et al. | 429/142 |
| 5,585,039 | 12/1996 | Matsumoto et al. | 429/192 |
| 5,597,659 | 1/1997 | Morigaki et al. | 429/190 |

OTHER PUBLICATIONS

Abraham, et al Electrochemical Science and Technology–Polymer Electrolytes Reinforced by Celgard® Membranes, J. Electrochem. Soc. vol. 142, No. 3, Mar. 1995.

*Primary Examiner*—Stephen Kalafut
*Assistant Examiner*—Carol Chaney
*Attorney, Agent, or Firm*—Kenneth M. Massaroni

[57] ABSTRACT

An electrochemical cell 10 includes first and second electrodes 12 and 14 with an electrolyte system 26 disposed therebetween. The electrolyte system includes at least a first and second layer 28 and 30, the second layer 30 being used to absorb an electrolyte active species and to adhere the adjacent layer of electrode material to the electrolyte system 26. The electrolyte system further includes a process for packaging and curing the electrolyte after it has been incorporated into a discrete battery device.

29 Claims, 6 Drawing Sheets

GEL ELECTROLYTE BONDED RECHARGEABLE ELECTROCHEMICAL CELL AND METHOD OF MAKING SAME

TECHNICAL FIELD

This invention relates in general to the field of electrolytes for electrochemical cells, and more particularly to methods of making electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there has been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than a liquid electrolyte. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. Thereafter, the solvent and the electrolyte salt may be introduced into the polymer system in order to swell and activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically highly hygroscopic) it offers problems with respect to performance and assembly. First, the gel electrolyte may lack sufficient mechanical integrity to prevent shorting between the electrodes while they are being bonded or laminated together with the electrolyte. The electrolyte layer thickness is reported to be 75 μm, presumably to overcome this shorting problem and to help facilitate handling of the electrolyte material. When compared to the 25 μm typical thickness for separators used in liquid lithium ion cells, this results in a significant reduction in the volumetric energy density for the cell.

Second, in order to create porosity in the electrolyte and electrode layers that will be used to absorb liquid electrolyte, a plasticizer is used. Unfortunately, the subsequent removal of this plasticizer to create the pores requires the use of flammable organic solvents. In addition to the safety hazard that is created, the time required for the solvent extraction process renders it relatively expensive. These problems are significant limitations to the successful implementation of gel electrolytes in electrochemical cells.

Accordingly, there exists a need for a new electrolyte system which combines the properties of good mechanical integrity, as well as the ability to absorb sufficient amounts of an electrolyte active species so as to produce an electrolyte system with the high ionic conductivity characteristic of liquid electrolytes. The electrolytes so formed should also avoid excessive swelling and all of the problems associated therewith.

DETAILED DESCRIPTION OF THE PREFERRED EMBODIMENT

Figure 1:
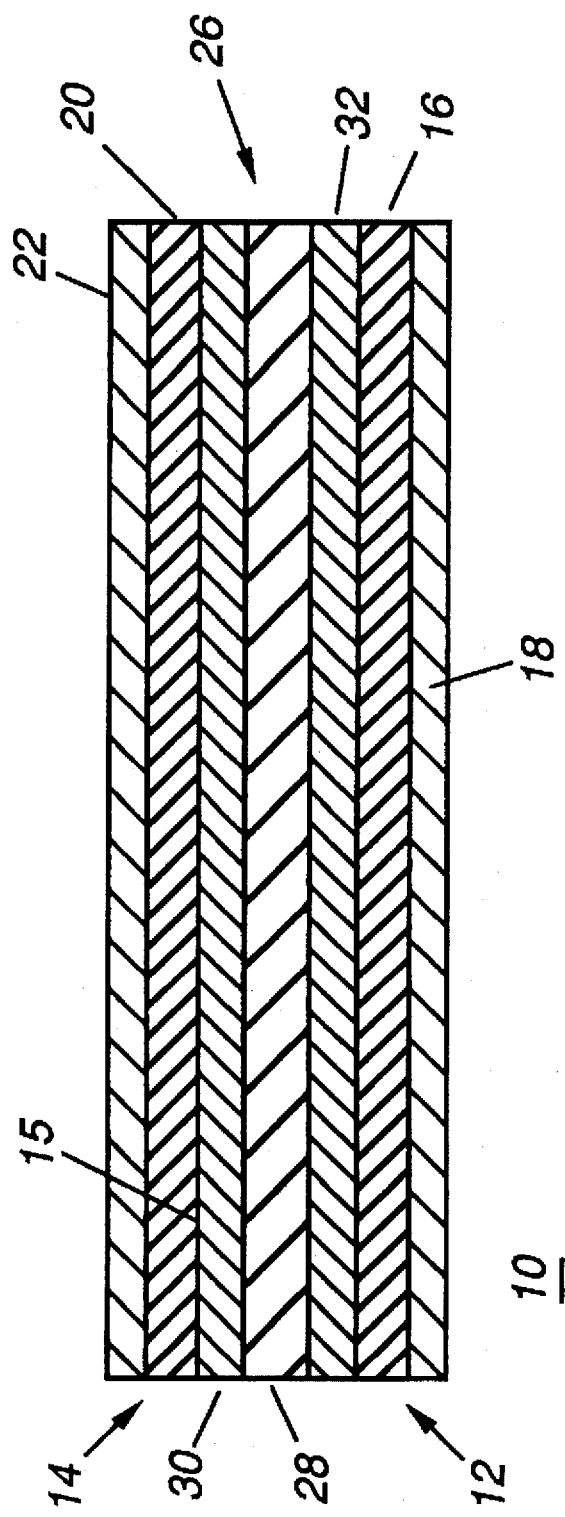
FIG. 1 is a cross sectional side view of an electrochemical cell in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of a gel electrolyte bonded electrochemical cell in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium: aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, in the names of Jinshan Zhang, et al., the disclosure of which is incorporated herein by reference.

More particularly, the anode 12 comprises a layer of active material 16 such as a carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper. The second electrode 14 may be adapted to be the cathode of a lithium rechargeable cell. In such an instance, the cathode is fabricated of the lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, co-pending U.S. patent application Ser. No. 08/464,440 in the name of Zhenhua Mao filed Jun. 5, 1995, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of known materials known in the art, examples of which include aluminum, nickel, and combinations thereof. In one preferred embodiment, substrate 22 is fabricated of aluminum.

Disposed between electrodes 12 and 14 is a layer of an electrolyte material system 26. The electrolyte system 26 comprises an electrolyte active species and a multi-phase polymer gel electrolyte support structure consisting of at least two different polymers. A first polymer is provided as an absorbing phase and the second polymer is provided as an inert phase. The insert phase 28 is provided to give mechanical integrity and structural rigidity to the electrolyte system. The absorbing phase 30, 32, which may be disposed on either or both sides of the inert phase, is adapted to engage the electrolyte active species therein. The gelling polymer may further act as a bonding paste to assist in adhering the electrodes to the inert polymer.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^-$ is an anion such as $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), acetone and combinations thereof. For other electrode combinations, i.e., Ni-Cd or Ni-metal hydride, other electrolyte active species may be used, such as KOH.

Figure 2:
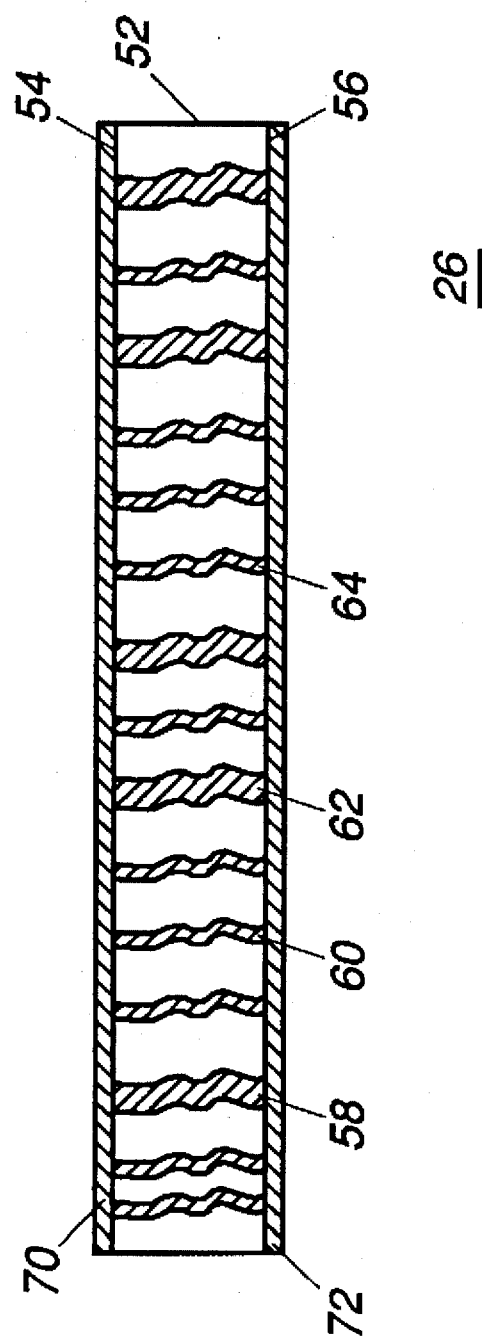
FIG. 2 is a cross-sectional side view of an electrolyte layer for use with an electrochemical cell, in accordance with the invention.

Referring now to FIG. 2, there is illustrated therein a cross-sectional side view of the electrolyte layer 26 of FIG. 1. The electrolyte system 26 comprises a first polymer phase 52 is a porous separator which is formed of a layer of inert polymer material. The term inert refers to the fact that the material itself is not absorbing, though the layer of material, due to its porosity (as described below) may be absorbing. This inert component may be fabricated or selected from the group of materials consisting of polyalkenes such as polyethylene, polypropylene, polytetrafluroethylene, polyethyleneterephthalate, polystyrene, ethylene propylene diene monomer, nylon, and combinations thereof. Layer 52 includes first and second major surfaces 54 and 56, respectively. Layer 52 may preferably be fabricated of polyethylene or polypropylene and is a highly porous layer having a plurality of pores, for example, 58, 60, 62 and 64 formed therein and therethrough. Indeed, the porosity of layer 52 is typically on the order of between 20 and 80%, and preferably between about 28 and 50%. As layer 52 is a layer of inert polymeric material it is hence provided to enhance the mechanical strength or integrity of the polymer electrolyte system.

Disposed on at least one of the first and second major surfaces, 54, 56 is a layer of an absorbing or gel-forming polymer 70. The absorbing or gel-forming polymer may be selected from the group of polymers, including polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. As illustrated in FIG. 2, the layer of the second polymeric material 70 is disposed on surface 54 of layer 52, and said polymeric material extends at least partially into and preferably through the pores in layer 52. A second layer 72 of a second polymeric material may be disposed on the second major surface 56 of layer 52. By disposing a layer of the second polymeric material on both sides of layer 52, it may be appreciated that the likelihood of completely filling the pores is increased. The layers of gel forming polymer 70, 72 may be fabricated of the same or different materials, as described hereinabove.

It is also to be noted that the layers of absorbing or gel forming polymer may alternatively be deposited on the electrodes, and subsequently put into contact with the inert polymer layer when the electrodes and the inert polymer are stacked together to complete the battery cell. More particularly, a layer of the absorbing polymer may be coated onto at least one surface 15 (of FIG. 1) of, for example, the cathode. Surface 15 is ultimately disposed adjacent the electrolyte system 26: Hence, when the inert polymer layer is arranged in stacked configuration with the electrodes, the absorbing polymer is disposed in contact with the inert polymer. Subsequently, when the stacked layers are pressed together, the absorbing polymer invades the pores of the inert polymer, adhering thereto as described hereinbelow.

Figure 3:
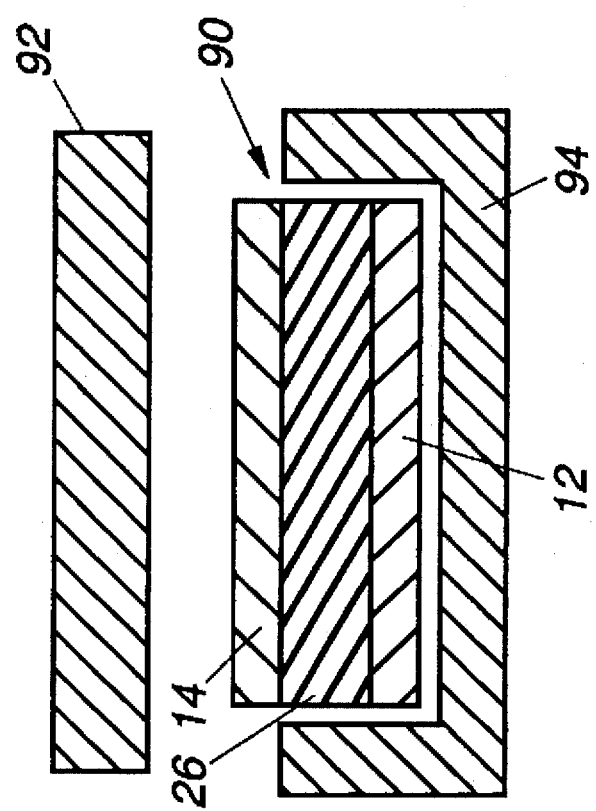
FIG. 3 is a stylized representation of the step of packaging an electrochemical anode, separator and cathode, in accordance with the invention.

The electrodes and separator materials described above may be fabricated into electrochemical cells by winding and/or stacking the layers of electrode and separator material. Discrete cells are then packaged between sheets of a vapor impermeable package as is illustrated in FIG. 3. More particularly, discrete cell 90, is packaged between sheets of water vapor impermeable material such as metal foil laminates. Sheets 92 and 94 enclose the discrete package, or cell. Either before or after the package is sealed, the electrolyte active material, as described above, is injected into the package.

The battery cell is then cured by exposing it both to a compression and heating step. More particularly, the packaged discrete battery cell is exposed to a temperature of between 50° and 150° C. for a period of time between 6 and 3600 seconds. The exact time will depend on the size of the cells themselves. The compression force used to seal and cure and battery pack is on the order of between 1 and 500 lbs/cm$^2$ and preferably between 50 and 100 lbs/cm$^2$. This heating and pressing step results in the absorbing polymer material being dissolved, along with the liquid electrolyte active species, wherein they seep or are forced into the pores of the inert polymer. When the cell cools and solidifies, or "gels" it serves the additional function of adhering the layers of electrode material to the separator.

The invention may be better understood from a perusal of the examples of which are attached hereto.

EXAMPLES

Example 1

Anode

Composition: 88 wt % graphite (Timcal SFG-44), 12% PVDF (Kynar 461 from Elf-Atochem)

dimensions: 5.5 cm×29 cm (coated)

current collector: Cu mesh (50 µm thickness)

Cathode

Composition: 87.2 wt % LiNiO2, 7.3 wt % graphite (Timcal KS-6), 2.4 wt % Carbon black, 3.1% PVDF (Kynar 461 from Elf-Atochem)

dimensions: 5.1 cm×20 cm (coated)

current collector: Al mesh (50 µm thickness)

Electrolyte System

Inert Polymer: Polypropylene (Celgard 2400 from Hoescht-Celanese Corp.) (25 µm thick), dimensions: 5.8 cm×44 cm, coated with PVDF Electrolyte active species: 1M LiPF6 in EC/DEC (40:60).

The inert polymer was coated with the gel forming polymer, specifically, dry PVDF, by dipping the polypropylene in a solution of PVDF dissolved in NMP and acetone (2.37 wt % PVDF in NMP/acetone 1/4.5 wt %) and further dried. (The optimum amount of PVDF coated onto the iner polymer is in the range of 0.3 g/cm$^2$ to 0.5 g/cm$^2$.) The inert polymer and electrodes were placed into a vapor and liquid impermeable package, after which the liquid electrolyte species was added, and the package was sealed.

The curing/gelling step was accomplished by placing the cell in between heated plates, heated to a temperature of approximately 90° C., and lined with silicone rubber, for a period of two minutes. A pressure of 2.5 Kg was applied, after which the structure was quenched between cold plates for 3 minutes. The quenching is an important step as it converts the PVDF coated separator and liquid electrolyte active species into a homogenous gel fusing the three cell components (anode, separator, cathode) together.

Figure 4:
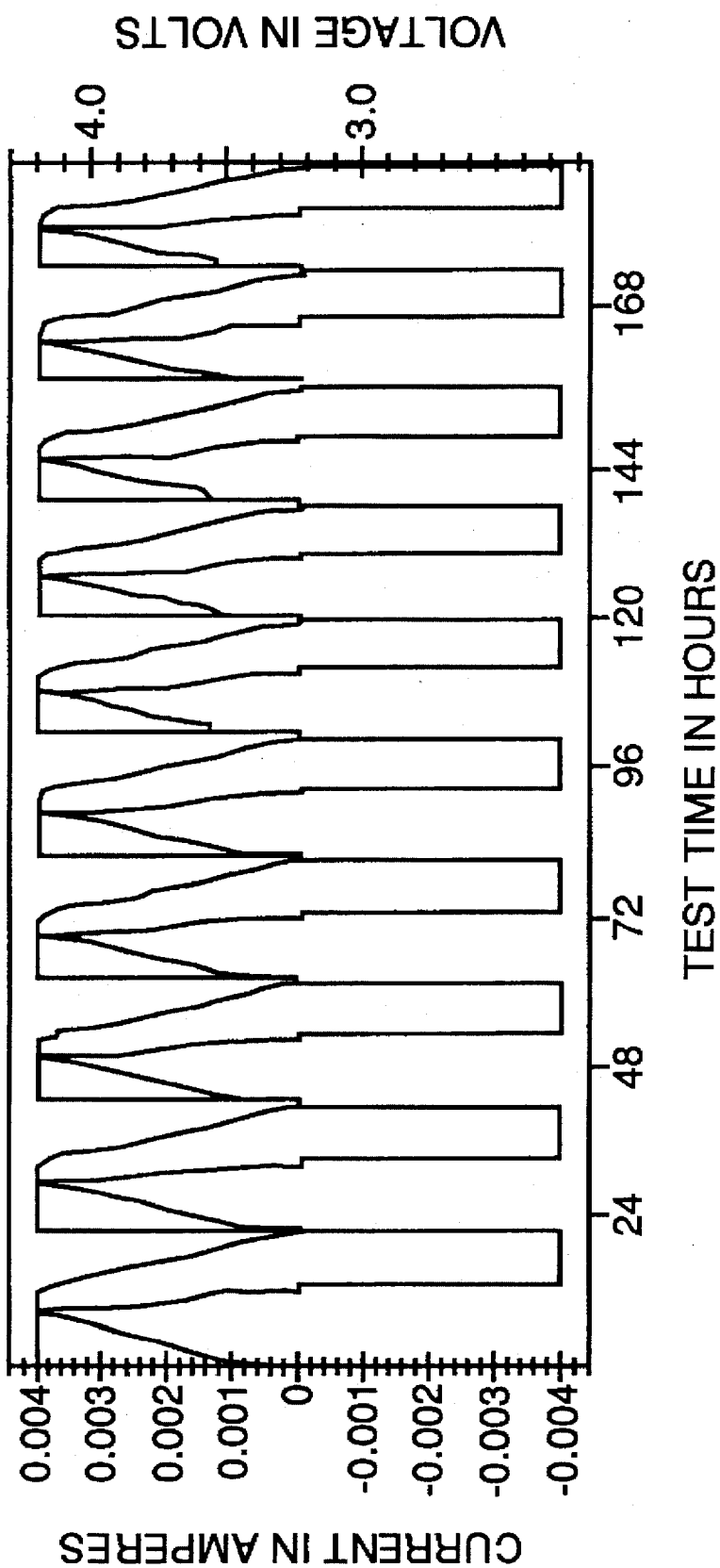
FIG. 4 is cycling data for a first electrochemical cell fabricated in accordance with the invention.

Cell performance for the device of this example is provided below. Specifically, cycling data for the first 10 cycles of the cell are provided in FIG. 4. The data suggests that the fabrication method, and the electrolyte system behave appropriately, yielding acceptable electrochemical performance.

Example 2

Anode

Composition: 88 wt % graphite (Timcal SFG-44), 12% PVDF (Kynar 461 from Elf-Atochem)

Cathode

Composition: LiCoO2 87.2 wt. %, Carbon Black 2.4 wt %, KS-6 graphite 7.3%, Kynar 461 PVDF 3.1%

Electrolyte System

Inert Polymer: Polypropylene (Celgard 2400 from Hoescht-Celanese Corp.) (25 µm thick), dimensions: 5.8 cm×44 cm, coated with PVDF Electrolyte active species: 1M LiPF6 in EC/DEC (40:60).

Two cells were constructed. In one cell each layer was coated with liquid electrolyte. In the other liquid electrolyte was added to only one side of the cell and allowed to wick through to the other side. After packaging, gelling was carried out at 90° C. for 2 minutes, followed by a quench to room temperature, as described in the previous example.

Figure 5:
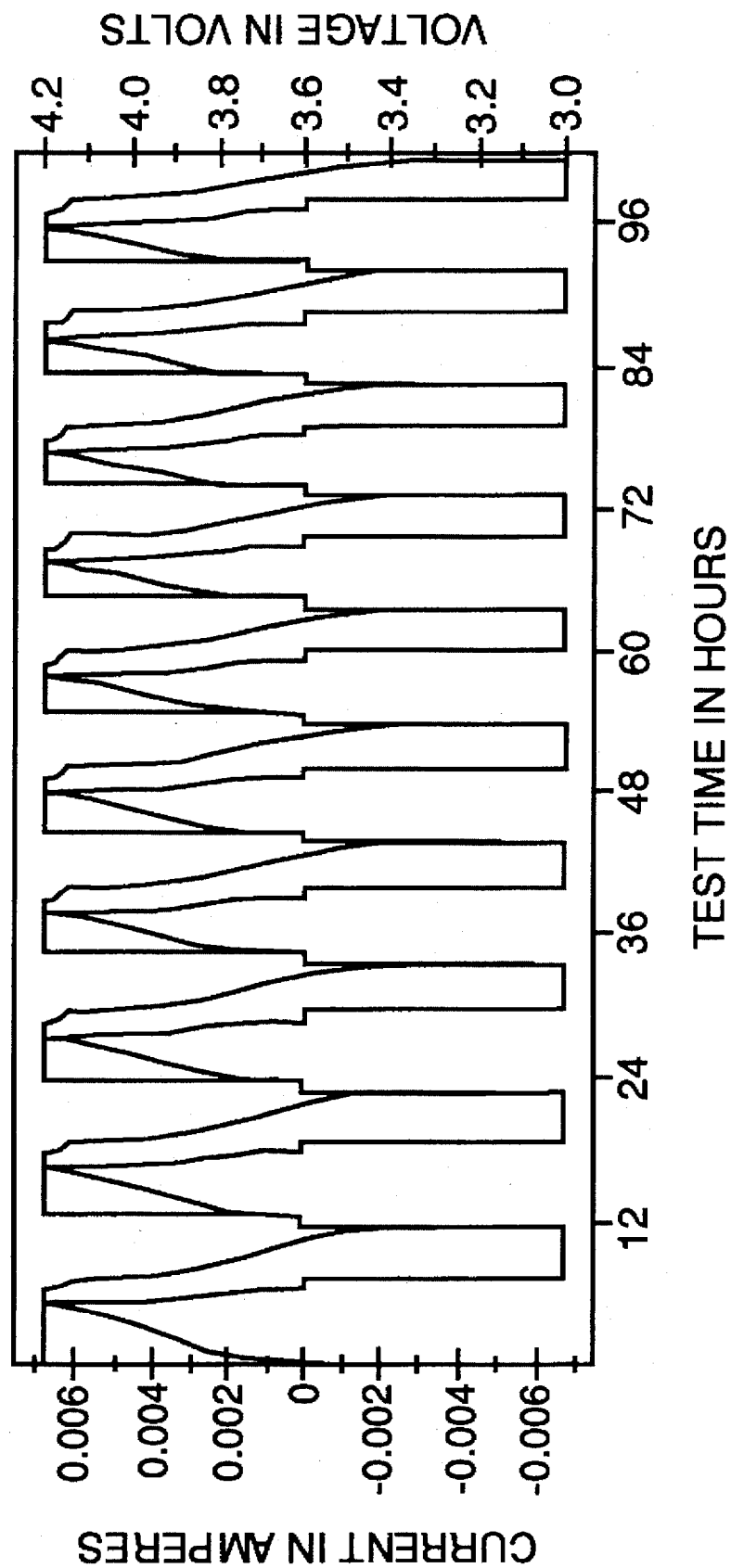
FIG. 5 is cycling data for a second electrochemical cell fabricated in accordance with the invention.

Both cells showed similar cycling performance, but reached only 80% of initial capacity in 7 cycles. The first 10 cycles for the first cell is shown in FIG. 5.

Example 3

A 500 mAh cell was assembled according to the following procedure:

Anode

Composition: 88 wt % graphite (Timcal SFG-44), 12% PVDF (Kynar 461 from Elf-Atochem); anode current collector 5.5×31.0 cm Cu mesh Cathode Composition: LiCoO2 87.2 wt. %, Carbon Black 2.4 wt %, KS-6 graphite 7.3%, Kynar 461 PVDF 3.1%; cathode current collector 5.1×22.0 cm Aluminum mesh Electrolyte System Inert Polymer: Polypropylene (Celgard 2400 from Hoescht-Celanese Corp.) (25 µm thick), dimensions: 5.8 cm×44 cm, coated with PVDF Electrolyte active species: 1M LiPF6 in EC/DEC (40:60).

The inert polymer was coated with PVDF by dip coating in a solution of 4 wt % PVDF in methyl ethyl ketone (MEK). The loading of PVDF onto the separator was 0.55 mg/cm$^2$. The cell components (electrodes and electrolyte system) were stacked, and the liquid electrolyte was applied to each interface.

Figure 6:
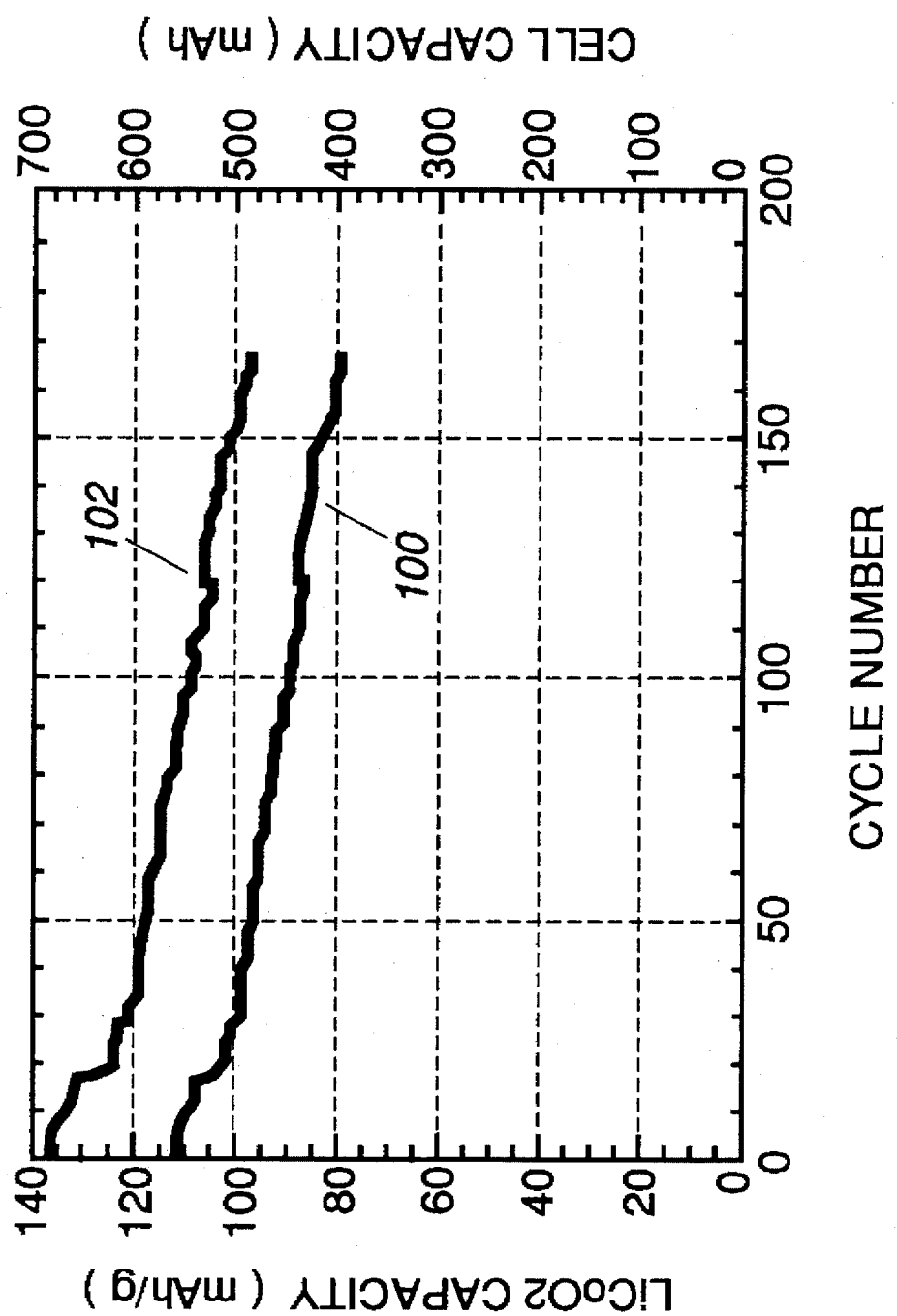
FIG. 6 is a chart comparing capacity versus cycle life for a third electrochemical cell fabricated in accordance with the invention.

After folding the cell was packaged in a flexible packaging laminate pouch. The gelling step consisted in placing the packaged cell in between heated plates (90° C.) lined with silicone rubber for five minutes with moderate pressure (plate pressure: 2.5 Kg) and quenching the whole cell in between cold plates for five minutes. The cycling data of the cell is represented in FIG. 6. The cell cycled for over 100 cycles with less than 20% capacity drop. More particularly, the capacity of the overall cell is illustrated by line 100, while the capacity for the cathode material alone is illustrated by line 102.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of making a rechargeable electrochemical cell including first and second electrodes, and a porous separator element having first and second major sides, said method comprising the sequential steps of:

coating at least one of said electrodes or said separator element with a layer of a gelling polymer;

disposing said first and second electrodes on opposite sides of said separator element;

introducing an electrolyte active species into at least said gelling polymer;

sealing said first and second electrodes and said separator element in a liquid and vapor impermeable package; and curing said gelling polymer.

2. A method as in claim 1, wherein said coating step comprises the further step of coating each of said electrodes and said separator element.

3. A method as in claim 1, wherein the curing step comprises heating said package.

4. A method as in claim 3, wherein said heating step comprises the further steps of heating said package to a temperature between 50° C. and 150° C. for a period of between 6 and 3,600 seconds.

5. A method as in claim 3, wherein said heating step comprises the further step of heating said package to a temperature between 85° C. and 95° C.

6. A method as in claim 3, wherein said heating step is applied for between 6 and 3600 seconds.

7. A method as in claim 1, wherein said curing step comprises the further step of pressing said electrodes and separator element together at a force of between 1 and 500 lbs/cm$^2$.

8. A method as in claim 1, wherein said porous separator element is fabricated of a material selected from the group consisting of polyethylene, polypropylene, polytetrafluroethylene, polystyrene, polyethyleneterephthalate, ethylene propylene diene monomer, nylon, and combinations thereof.

9. A method as in claim 1, wherein said gelling polymer is selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of the monomers of any of the foregoing, and combinations thereof.

10. A method as in claim 1, wherein said electrolyte active species comprises an electrolyte salt dispersed in an organic solvent.

11. A method as in claim 10, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

12. A method as in claim 10, wherein said electrolyte salt includes an anion selected from the group consisting of Cl$^-$, Br$^-$, I$^-$, ClO$_4^-$, BF$_4^-$, PF$_6^-$, ASF$_6^-$, SbF$_6^-$, CH$_3$CO$_2^-$, CF$_3$SO$_3^-$, N(CF$_3$SO$_2$)$_2^-$, C(CF$_3$SO$_2$)$_2^-$ and combinations thereof, and a cation selected from the group of Li$^+$, Na$^+$, K$^+$, and combinations thereof.

13. A method of making an electrochemical cell having first and second electrodes, said method comprising the sequential steps of:

providing a porous separator element having a gelling polymer coated on first and second surfaces thereof;

disposing said first and second electrodes on said coated first and second surfaces of said porous separator element, respectively;

introducing an electrolyte active species into at least said gelling polymer; and curing said gelling polymer.

14. A method as in claim 13, wherein the curing step comprises heating said electrodes and separator.

15. A method as in claim 14, wherein said heating step comprises the further steps of heating said electrodes and separator to a temperature between 50° C. and 150° C. for a period of between 6 and 3,600 seconds.

16. A method as in claim 14, wherein said heating step comprises the further step of heating said electrodes and separator to a temperature between 85° C. and 95° C.

17. A method as in claim 14, wherein said heating step is applied for between 6 and 3600 seconds.

18. A method as in claim 13, wherein said curing step comprises the further step of pressing said electrodes and separator element together at a force of between 1 and 500 lbs/cm$^2$.

19. A method as in claim 13, wherein said porous separator element is fabricated of a material selected from the group consisting of polyethylene, polypropylene, polytetrafluroethylene, polystyrene, polyethyleneterephthalate, nylon, and combinations thereof.

20. A method as in claim 13, wherein gelling polymer is selected from the group consisting of polyvinylidene fluoride (PVDF), polyurethane, polyethylene oxide, polyacrylonitrile, polymethylacrylate, polyacrylamide, polyvinylacetate, polyvinylpyrrolidone, polytetraethylene glycol diacrylate, copolymers of the monomers of any of the foregoing, and combinations thereof.

21. A method as in claim 13, wherein said electrolyte active species comprises an electrolyte salt dispersed in an organic solvent.

22. A method as in claim 21, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

23. A method as in claim 21, wherein said electrolyte salt includes an anion selected from the group consisting of Cl$^-$, Br$^-$, I$^-$, ClO$_4^-$, BF$_4^-$, PF$_6^-$, ASF$_6^-$, SbF$_6^-$, CH$_3$CO$_2^-$, CF$_3$SO$_3^-$, N(CF$_3$SO$_2$)$_2^-$, C(CF$_3$SO$_2$)$_2^-$ and combinations thereof, and a cation selected from the group of Li$^+$, Na$^+$, K$^+$, and combinations thereof.

24. A method of making an electrochemical cell having first and second electrodes, said method comprising the sequential steps of:

providing a separator element having a coating of PVDF disposed on first and second major surfaces thereof;

disposing said PVDF coated separator between said first and second electrodes;

introducing an electrolyte active species into at least said PVDF; and heating said electrodes, coated separator, and electrolyte active species to a temperature sufficient to bond said electrodes to said coated separator.

25. A method as in claim 24, wherein said heating step comprises the further steps of heating said electrodes, coated separator, and electrolyte active species to a temperature between 50° C. and 150° C. for a period of between 6 and 3,600 seconds.

26. A method as in claim 24, wherein said heating step comprises the further step of heating said electrodes, coated separator, and electrolyte active species to a temperature between 85° C. and 95° C.

27. A method as in claim 24, wherein said heating step is applied for between 6 and 3600 seconds.

28. A method as in claim 24, wherein said heating step comprises the further step of pressing said electrodes and separator element together at a force of between 1 and 500 lbs /cm$^2$.

29. A method as in claim 24, wherein said separator element is fabricated of a material selected from the group consisting of polyethylene, polypropylene, polytetrafluroethylene, polystyrene, polyethyleneterephthalate, ethylene propylene diene monomer, nylon, and combinations thereof.

* * * * *